2,846,425

STABILIZED CATALYST AND IMPROVED POLYMERIZATION PROCESS

John Paul Hogan and Robert L. Banks, Bartlesville, Okla., assignors to Phillips Petroleum Company, a corporation of Delaware No Drawing. Application June 1, 1954
Serial No. 433,804

23 Claims. (Cl. 260—93.7)

This invention relates to polymerization of olefins. In one aspect, it relates to a novel catalyst composition. In another aspect, it relates to a method of preparing a catalyst. In another aspect, it relates to a process for the polymerization of olefins to form polymers ranging in properties from viscous liquids to solids.

The copending application of J. P. Hogan and R. L. Banks, Serial No. 333,576, filed January 27, 1953, discloses that certain olefins can be polymerized to obtain normally solid polymers by contacting said olefins under polymerization conditions with a chromium oxide polymerization catalyst. The polymer products obtained by the process disclosed are primarily solid, plastic materials useful for the formation of molded articles, pipe, tubing, insulation, and protective coatings. The polymerization temperature in the process is in the range of about 100 to about 450° F. The olefin is generally reacted in solution in a solvent. The pressure is a moderately elevated pressure sufficient to maintain the hydrocarbon feed predominantly in the liquid phase. It is desirable that at least part of the chromium oxide in the catalyst be in the form of hexavalent chromium. As the conversion period continues, heavy polymer and other carbonaceous materials are deposited on the catalyst and are eventually removed by treatment with a solvent, followed by removal of residual carbonaceous material by treatment with an oxidizing gas at elevated temperatures. Repeated process and regeneration periods ultimately result in a decrease in the hexavalent chromium content of the catalyst.

This invention provides a catalyst useful in such a polymerization process, and a process wherein the decline in hexavalent chromium content in such a catalyst is retarded by incorporation of a stabilizing agent into the catalyst.

According to this invention, there is provided a chromium oxide polymerization catalyst containing a stabilizing amount of strontium oxide.

Further, according to a specific aspect of this invention, an improved catalyst is prepared by depositing chromium oxide and strontium oxide on a support comprising at least one oxide selected from the group consisting of silica and alumina.

Further, according to the invention, an olefin is polymerized by contacting same with a catalyst comprising chromium oxide and strontium oxide under polymerization conditions.

The amount of strontium oxide in the catalyst of this invention is, generally, a minor amount and is ordinarily within the range 0.2 to 4 gram atoms of strontium per gram atom of chromium. Highly satisfactory results are obtained when the strontium oxide content is within the range 0.5 to 2 gram atoms of strontium per gram atom of chromium.

It is generally desirable that the catalyst comprise chromium oxide deposited on a suitable support or carrier, above described, which is not necessarily catalytically inert and which can contribute to the total activity of the catalyst. A generally suitable range of chromium content of the catalyst is from 0.1 to 10 weight percent, although greater percentages can be used. A suitable support is one selected from the group consisting of silica, alumina, and mixtures of silica and alumina. The alumina can be in the form of synthetic alumina gel, bauxite, activated alumina or other known forms of porous alumina. Silica gel is also a satisfactory support. One class of supports which is often preferred is composed of composites of silica and alumina. Examples are: acid-treated clays, synthetic silica-alumina gels, such as those used as cracking catalysts, and similar composites. One very satisfactory support is a commercial coprecipitated silica-alumina gel containing about 10 weight percent alumina and 90 weight percent silica. Another satisfactory support contains 98 weight percent silica and 2 weight percent alumina. However, composites containing a preponderance of alumina can be used.

As previously indicated, it is highly desirable that the catalyst contain at least about 0.01 and preferably 0.5 weight percent of chromium as oxide and in the hexavalent state.

The catalyst of this invention is ordinarily prepared by depositing an oxide of chromium and an oxide of strontium on the support. However, coprecipitation of these oxides with the support, and other known methods of preparing catalysts, can be used. It has been found that a highly desirable catalyst can be prepared by treating the support with an aqueous dispersion of a chromium compound which is convertible to chromium oxide on heating and with an aqueous dispersion of a strontium compound which is convertible to strontium oxide on heating. The support can be treated with the dispersion of the chromium compound in one step and with the dispersion of the strontium compound in another step; or the support can be treated with an aqueous medium having both the chromium and the strontium compound dispersed therein. The resulting composite is then dried, calcined to form the oxides and treated with dry air at a temperature in the range 750 to 1000° F. for a period of 3 to 10 hours or more. Dispersion media other than water, e. g. ethanol, pentanol, or acetone, can be used.

In one embodiment of the invention, the support can be treated with an aqueous dispersion of the chromium compound, dried and calcined, and subsequently treated with a dispersion of the strontium compound, followed by drying and calcination. In another embodiment of the invention, the strontium compound can be deposited on the carrier and, after drying and calcination, the chromium compound can be deposited on the resulting composite, followed by drying and calcination.

One preferred method of preparing the catalyst comprises treating the carrier with a mixed solution of water-soluble compounds of strontium and chromium, such as the nitrates, drying the resulting composite, and activating with oxygen or a gas containing oxygen, preferably dry air, at a temperature in the range of 750 to 1000° F. for a period of 3 to 10 hours or more.

Suitable strontium and chromium compounds for deposition on the carrier are the oxides, the nitrates, the acetates, chromic acid, chromic chloride, chromic sulfate, strontium carbonate, strontium hydroxide, strontium chromate, and strontium dichromate.

When the carrier is treated with a dispersion (i. e. a solution or a suspension) of the two compounds, the ratio of chromium to strontium in the dispersion can be maintained within the previously mentioned range of ratios of strontium to chromium.

The polymerization process, according to this invention, is conducted by contacting the olefin feed with the catalyst at a temperature in the range 100 to 450° F., preferably at least 150° F. Olefins utilizable as starting materials are aliphatic 1-olefins having a maximum chain length of eight carbon atoms and no chain branching nearer the double bond than the 4-position. Examples are: ethylene, propylene, 1-butene, 1-pentene, butadiene and 1,3-pentadiene. Copolymers, for example, of ethylene and propylene, can be prepared by the process of this invention.

It is preferred that the olefin be contacted in solution in a suitable solvent which is ordinarily a hydrocarbon having from 3 to 12 carbon atoms per molecule and which is inert under the polymerization conditions. The concentration of olefin in the solution is ordinarily in the range 0.1 to 10, preferably 1 to 6, weight percent, but higher concentrations can be used. Gas-phase contacting can be used, however. Paraffins, such as propane, isobutane, isopentane, n-hexane, isooctanes, n-decane and n-dodecane are suitable as solvents.

The polymerization pressure is generally a pressure sufficient to maintain the hydrocarbon feed predominantly in the liquid phase, e. g. 100 to 700 p. s. i.

The liquid hourly space velocity is ordinarily in the range 0.1 to 20, preferably 2 to 8.

The contacting of the hydrocarbon feed with the catalyst can be effected by any of the contacting methods known in the art, e. g. fixed-bed or mobile catalyst methods, such as the use of a gaseous suspension of catalyst, a liquid slurry, a fluidized bed, or a moving bed of catalyst.

The reaction effluent is processed, e. g. by fractional distillation or by cooling followed by filtration, to recover the normally solid polymer. An appreciable amount of the polymer is usually deposited on the catalyst and can be removed by washing with a solvent of the type described, at a temperature above the polymerization temperature, to recover the deposited polymer.

When the activity of the catalyst has declined, the catalyst is regenerated by removal of polymer as described above and subsequent treatment with an oxidizing gas at an elevated temperature to remove residual carbonaceous matter. The catalyst can then be activated by treatment with dry air at 750 to 1000° F., as described in connection with the preparation of the catalyst. Removal of carbonaceous matter can be facilitated by contacting the catalyst, after the solvent treatment and prior to treatment with the oxidizing gas, with an inert gas, such as nitrogen, at a temperature in the range 650 to 1000° F., preferably 650 to 800° F. for a time in the range 30 minutes to one hour. This treatment appears to remove residual carbonaceous material by cracking.

*Example I*

A catalyst according to this invention was prepared as follows: Five hundred cc. of a coprecipitated composite comprising 90 weight percent silica and 10 weight percent alumina (commercial cracking catalyst) in the form of 5/32 x 5/32-inch pellets, was immersed in 500 cc. of an aqueous solution of chromic nitrate and strontium nitrate (0.78-molar concentration of each salt in the solution). After 10 minutes, the excess liquid was removed by filtration and the composite was dried. The dried composite was placed in an electrically heated stainless steel tube. Dry air (not over 0.5 mol percent $H_2O$) was passed through the tube for 5 hours at a hourly gaseous space velocity of 300, the catalyst being maintained at 950° F. The product catalyst contained 2.5 weight percent total chromium as oxide, of which 2.07 weight percent corresponded to hexavalent chromium as determined by leaching with water and measuring the chromium content of the leachings, and a gram-atom ratio of strontium to chromium of 1:1.

*Example II*

The catalyst prepared according to Example I was compared with a catalyst prepared by exactly the same procedure but in the absence of any strontium compound. The two catalysts were utilized in a series of alternate polymerization and regeneration cycles. In the polymerization cycles, each of which lasted for 12 hours, a feed comprising 97.4 weight percent isooctane (2,2,4-trimethylpentane), 2.0 weight percent ethylene, and 0.6 weight percent ethane was contacted with a fixed bed of the catalyst at 320–330° F., 450 p. s. i., and a liquid hourly space velocity of 6. Polymer deposited on the catalyst was removed at the end of each polymerization period by passing isooctane through the reactor at 375° F. The solid polymer was recovered by evaporation of the isooctane.

The catalysts were then regenerated by heating in a stream of nitrogen at 850° F. and a gaseous hourly space velocity of 500 for one hour, contacting with a mixture of 98 percent nitrogen and 2 percent oxygen at a maximum temperature of 950° F. to burn off carbonaceous deposits, and heating in dry air for 5 hours at 950° F. and 300 gaseous hourly space velocity. At the end of the regeneration period, the catalysts were again used in a polymerization period, as previously described. A sample of the regenerated catalyst was analyzed to determine the hexavalent chromium content (by leaching with water) at the end of each regeneration period. The following results were obtained:

SrO-CONTAINING CATALYST

| No. Regenerations | $Cr^{+6}$ Content, wt. Percent | $Cr^{+6}$ Loss, Percent | Ethylene Conversion, Percent per pass |
|---|---|---|---|
| 0 | 2.07 | 0 | 92 |
| 1 | 1.73 | 16 | 96 |
| 2 | 1.70 | 18 | 92 |
| 3 | 1.57 | 24 | 94 |
| 4 | 1.57 | 24 | 94 |

Sr-FREE CATALYST

| 0 | 2.16 | 0 | 93 |
| 1 | 1.90 | 12 | 92 |
| 2 | 1.59 | 26 | 96 |
| 3 | 1.39 | 36 | 95 |

The foregoing data show that strontium oxide stabilizes the catalyst and retards diminution of the hexavalent chromium content. Although, in the case of the strontium-free catalyst, after 3 regenerations, the conversion rate was still high, further extended usage causes further diminution of the hexavalent chromium content of the catalyst, and ultimate deactivation is reached sooner than when strontium oxide is present.

The deactivation of the catalyst can be further retarded by effecting the burning of carbon deposits below 800° F. Thus when the catalyst of Example I was so regenerated, the preliminary nitrogen treatment being omitted, the hexavalent chromium loss was 8 percent after one regeneration, 10 percent after two regenerations, 12 percent after three regenerations, 17 percent after four regenerations, and 18 percent after five regenerations, polymerization conditions being as previously described.

*Example III*

The moisture resistance of the catalyst described in Example I was compared with that of the strontium-free catalyst described in Example II by treating each catalyst with a stream of air containing 3 mol percent water vapor at 950° F. for 6 hours at a gaseous hourly space velocity of 300, continuing the contacting with dry air (not over 0.5 mol percent $H_2O$) at the same temperature and space velocity for 5 hours, and determining the loss of hexavalent chromium. The strontium oxide-containing catalyst lost only 5 percent of its hexavalent chromium, whereas the strontium-free catalyst lost 48 percent of its hexavalent chromium.

The catalysts of this invention can be used in the preparation of olefin polymers ranging in properties from heavy, viscous liquids, semisolids, and tacky materials to normally solid, flexible or brittle plastics, which are more fully described in our cited application. No adverse affects on the polymer properties or yields are obtained when the catalysts of this invention are used.

The polymers so prepared have substantially the same properties as those prepared in our cited copending application. Thus the polymers prepared as described in Example II by use of the strontium oxide-containing catalyst had molecular weights (based on measurements of intrinsic viscosity utilizing solutions of the polymers in tetralin) ranging from 10,800 to 14,300, densities (at 20° C.) ranging from 0.952 to 0.955, and melting points ranging from 242 to 245° F. Those obtained by utilizing the strontium-free catalyst in Example II had molecular weights from 12,000 to 13,300, densities (at 20° C.) from 0.950 to 0.954 and a melting point of 244° F. (determined from cooling curves).

From the foregoing, it will be seen that we have provided a novel composite polymerization catalyst comprising chromium oxide and a stabilizing proportion of strontium oxide, a method of preparing the catalyst, and a method of polymerizing olefins by contacting with the catalyst. While certain compositions, process steps, and examples have been described for purposes of illustration, it is clear that the invention is not limited thereto.

We claim:

1. A chromium oxide polymerization catalyst stabilized by the presence of a minor proportion of strontium oxide, said oxides being admixed with at least one oxide selected from the group consisting of silica and alumina, and at least part of the chromium being in the hexavalent state.

2. A catalyst comprising from 0.1 to 10 weight percent chromium as oxide, at least part of the chromium being in the hexavalent state from 0.2 to 4 gram atoms of strontium, as strontium oxide, per gram atom of chromium, and the remainder at least one oxide selected from the group consisting of silica and alumina.

3. A catalyst according to claim 2 wherein the strontium is present in an amount in the range 0.5 to 2 gram atoms of strontium per gram atom of chromium.

4. A catalyst according to claim 2 containing at least 0.01 weight percent of chromium in the hexavalent state.

5. A catalyst preparation method comprising treating a porous solid support, comprising at least one oxide selected from the group consisting of silica and alumina, with a dispersion of a chromium compound convertible to chromium oxide containing hexavalent chromium and a dispersion of a strontium compound calcinable to strontium oxide on heating, drying the resulting composite, and heating in an oxidizing atmosphere to form the oxides in which at least part of the chromium is in the hexavalent state.

6. A catalyst preparation process comprising treating at least one oxide selected from the group consisting of silica and alumina with an aqueous dispersion containing a chromium compound convertible, on heating, to chromium oxide in which at least part of the chromium is hexavalent and a strontium compound, calcinable to strontium oxide on heating, drying the resulting composite, and contacting the dried composite with dry air at a temperature in the range 750 to 1000° F. for a time in the range 3 to 10 hours to obtain a composite containing from 0.1 to 10% chromium as oxide, at least part of the chromium being in the hexavalent state, and from 0.2 to 4 gram atoms of strontium, as strontium oxide, per gram atom of chromium.

7. A method according to claim 6 wherein said chromium compound is chromic nitrate and said strontium compound is strontium nitrate.

8. A method according to claim 6 wherein said chromium compound is chromic acid and said strontium compound is strontium nitrate.

9. A process according to claim 6 wherein said chromium compound is chromic acid and said strontium compound is strontium hydroxide.

10. A method according to claim 6 wherein said chromium compound is chromic acid and said strontium compound is strontium acetate.

11. A process according to claim 6 wherein said chromium compound is chromic acid and said strontium compound is strontium carbonate.

12. A process which comprises treating at least one oxide selected from the group consisting of silica and alumina with an aqueous dispersion of a strontium compound which is calcinable to strontium oxide, calcining a resulting composite to convert said compound to strontium oxide, treating the resulting composite with an aqueous dispersion of a chromium compound convertible, on heating, to chromium oxide containing hexavalent chromium drying a resulting composite, activating the dried composite with air at a temperature in the range 750 to 1000° F. to form a catalyst containing chromium oxide in which at least part of the chromium is hexavalent, and recovering said catalyst.

13. A process which comprises treating at least one oxide selected from the group consisting of silica and alumina with an aqueous dispersion of a chromium compound convertible, on heating, to chromium oxide in which at least part of the chromium is hexavalent heating a resulting composite to form chromium oxide, treating the resulting material with an aqueous dispersion of a strontium compound calcinable to strontium oxide on heating, drying a resulting composite, and treating the dried composite with a stream of air at a temperature in the range 750 to 1000° F. to convert said strontium compound to strontium oxide and said chromium compound to said oxide in which at least part of the chromium is hexavalent, and recovering a resulting catalyst.

14. A process which comprises polymerizing, to form normally solid polymer, at least one aliphatic 1-olefin having a maximum chain length of 8 carbon atoms and no branching nearer the double bond than the 4-position, said polymerizing being conducted at a temperature in the range 100 to 450° F. in the presence of an active polymerization catalyst comprising chromium oxide supported on at least one support material selected from the group consisting of silica and alumina, at least part of the chromium in said catalyst being in the hexavalent state, said catalyst also containing, as a supported component, a minor proportion of strontium oxide sufficient to stabilize the hexavalent chromium in said catalyst.

15. A process which comprises contacting an aliphatic 1-olefin having a maximum chain length of 8 carbon atoms and no chain branching nearer the double bond than the 4-position, with a catalyst comprising from 0.1 to 10 weight percent of chromium as oxide, at least part of the chromium being in the hexavalent state, from 0.2 to 4 gram atoms of strontium, as strontium oxide, per gram atom of chromium, and the remainder at least one oxide selected from the group consisting of silica and alumina, said olefin being in solution in a hydrocarbon which is inert under the polymerization conditions, said contacting being conducted at a temperature in the range 100 to 450° F., and a pressure sufficient to maintain the solution substantially in the liquid phase.

16. A process which comprises contacting an aliphatic 1-olefin having a maximum chain length of 8 carbon atoms and no chain branching nearer the double bond than the 4-position with a catalyst comprising from 0.1 to 10 weight percent chromium as oxide, at least 0.01 weight percent of the catalyst being hexavalent chromium, from 0.5 to 2 gram atoms of strontium, as strontium oxide, per gram atom of chromium, and the remainder at least one oxide selected from the group consisting of silica and alumina, said olefin being dissolved in a paraffinic hydrocarbon having from 3 to 12 carbon atoms per molecule to form a solution having an olefin concentration in the range 0.1 to 10 weight percent, said contacting being conducted at a temperature in the range 150 to 450° F., a pressure sufficient to maintain the hydrocarbon mixture predominantly in the liquid phase, and a liquid hourly space velocity in the range 0.1 to 20, and recovering a normally solid polymer of said olefin.

17. A process according to claim 16 wherein said olefin is ethylene and said solvent is 2,2,4-trimethylpentane.

18. A process according to claim 16 wherein said olefin is a mixture of ethylene and propylene, said solvent is 2,2,4-trimethylpentane, and a copolymer of ethylene and propylene is recovered as a product of the process.

19. A process according to claim 16 wherein said olefin is propylene and said solvent is 2,2,4-trimethylpentane.

20. A process according to claim 16 wherein said olefin is 1-butene and said solvent is 2,2,4-trimethylpentane.

21. A process according to claim 16 wherein said olefin is 1-pentene and said solvent is 2,2,4-trimethylpentane.

22. A catalyst active for the polymerization of olefins and comprising from 0.1 to 10 weight percent chromium in the form of chromium oxide, from 0.2 to 4 gram atoms of strontium, as strontium oxide, per gram atom of chromium, at least 0.01 weight percent of the catalyst being hexavalent chromium, and the remainder a silica-alumina composite.

23. A process which comprises polymerizing ethylene, in admixture with a liquid hydrocarbon which is inert and nondeleterious under the reaction conditions subsequently described, in the presence of a catalyst which is active for such polymerization and which comprises from 0.1 to 10 weight percent of chromium in the form of chromium oxide, from 0.2 to 4 gram atoms of strontium, as strontium oxide, per gram atom of chromium, at least 0.01 weight percent of the total catalyst being hexavalent chromium, and the remainder a silica-alumina composite, the polymerization being conducted at a temperature in the range 100 to 450° F. and a pressure sufficient to maintain said inert hydrocarbon substantially in the liquid phase.

References Cited in the file of this patent

UNITED STATES PATENTS

| | | |
|---|---|---|
| 2,238,474 | McNamce et al. | Apr. 15, 1941 |
| 2,271,751 | Visser et al. | Feb. 3, 1942 |
| 2,339,349 | Morey | Jan. 18, 1944 |
| 2,351,094 | Blaker | June 13, 1944 |
| 2,404,788 | Burk | July 30, 1946 |
| 2,422,372 | Smith et al. | June 17, 1947 |
| 2,691,647 | Field et al. | Oct. 12, 1954 |
| 2,692,259 | Peters | Oct. 19, 1954 |
| 2,693,497 | Ballard et al. | Nov. 2, 1954 |
| 2,726,234 | Field et al. | Dec. 6, 1955 |